2,674,281

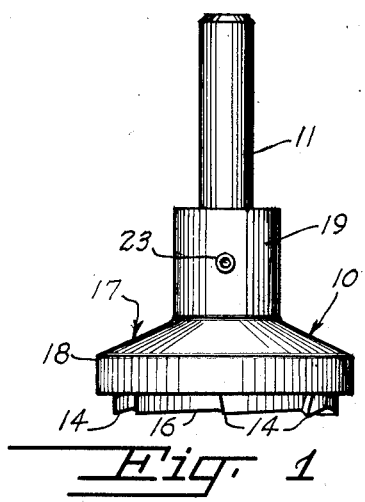
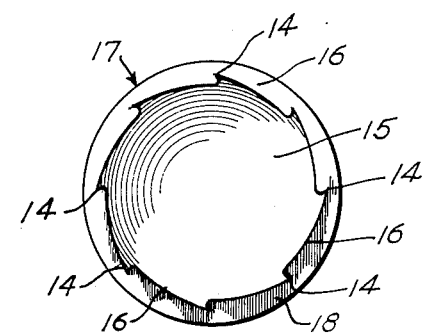
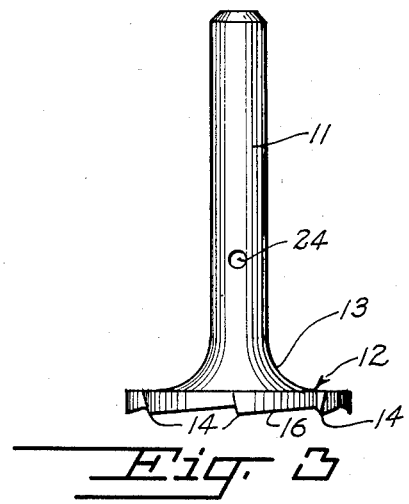
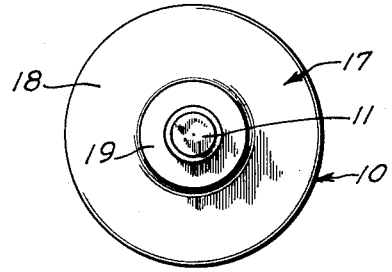
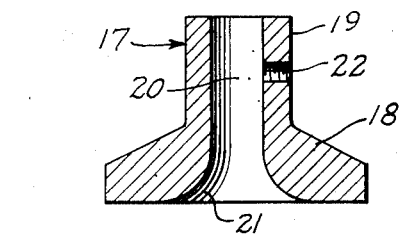
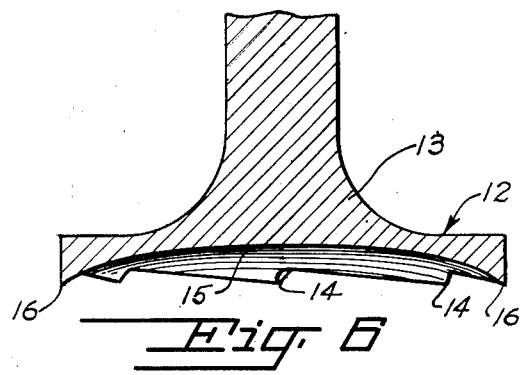
INVENTOR
Russell H. Fullmer
BY
ATTORNEY Patented Apr. 6, 1954

UNITED STATES PATENT OFFICE 2,674,281

ROTARY DISK CUTTER

Russell H. Fullmer, Williamsport, Pa.

Application September 24, 1952, Serial No. 311,276

2 Claims. (Cl. 144—118)

This invention relates to a cutting device for use in a drill press and it consists in the constructions, arrangements and combinations herein described and claimed.

It is the cardinal object of the invention to provide a rotary disk cutter for use in a drill press, which may be employed for routing, planing, rabbeting, dressing and finishing all types of wood, the planer embodying teeth so spaced and constructed as to eliminate chattering and scattering wood chips during operation.

More specifically, it is an object of the invention to provide a rotary disk cutter wherein the cutting teeth are formed upon the periphery of the body thereof, the major portion of the work engaging face of the planer having a concave formation extending from the outer edge of respective cutting teeth toward the center of the disk cutter, the teeth thus having a very effective forwardly advanced cutting edge.

A still further object of the invention is the provision of a guard device to be employed with the rotary disk cutter, the guard being of such diameter as to overlie the cutting teeth of the disk cutter and prevent contact with the hands of an operator.

Additional objects, advantages and features of invention will be apparent from the following description considered in conjunction with the accompanying drawing, wherein Figure 1 is a side elevation of the rotary disk cutter and guard in operative position.

Figure 2 is a bottom plan view thereof.

Figure 3 is a side elevation of the disk cutter with the guard removed.

Figure 4 is a vertical section through the guard.

Figure 5 is a top plan view of the disk cutter shown in Figure 1, and

Figure 6 is an enlarged fragmentary vertical section of the disk cutter.

Attention is first invited to Figures 1 and 2 of the drawing, wherein a combined rotary disk cutter and guard is shown, the disk cutter having a shank 11 for securement in the conventional chuck of a drill press (not shown).

The shank 11 is integrally formed with a disk cutter head 12, extending axially from the upper face thereof, the shank being arcuately flared as at 13 (see Figure 3) forming a substantial conical base at the juncture with the head 12.

As clearly shown in Figures 1 and 2, the disk cutter head 12 has a plurality of equally spaced teeth 14, ground arcuately within the periphery of the body and so arranged that the forward cutting edge of one tooth will be diametrically opposite the forward cutting edge of an opposed tooth. The underface 15 of the disk head 12 is of conical formation, as clearly shown in Figure 6, the concavity extending to the periphery of the head, thus providing a cutting edge 16 between each of the teeth 14 and at right angles to said teeth.

Inasmuch as the teeth 14 and cutting edges 16 are formed on the periphery of the disk head 12, there is a liability that an operator's hand and fingers may come into contact with the teeth and cutting edges and cause serious injury, a guard 17 is provided. The guard 17 consists of a body 18 of annular form of a diameter greater than the disk head 12 and having an axial collar 19 having a bore 20 of a diameter to receive the shank 11 therethrough. The collar is of a length permitting the shank to project therefrom so that the disk may be properly secured in the chuck of a drill press. The lower end of the bore 20 is outwardly flared as at 21 and corresponds to the conical base 13 of the disk head so that the guard 17 may snugly seat upon the disk head. A threaded opening 22 is formed in the collar 19 extending at right angles to the bore 20 and receives a suitable screw 23, the inner end of which seats in a recess 24 formed in the shank 11 of the disk. As clearly shown in Figures 1 and 2, the guard 17 extends circumferentially beyond the teeth 14 and the cutting edges 16 of the disk head.

In use, the disk head is secured in the chuck of the drill press and rotated as is customary, and by virtue of the formation of the teeth 14 on the periphery of the disk head and concave formation of the underface of the head, the cutting edges provided between the teeth cooperate with the teeth in producing an initial and continuous smooth and efficient cutting action upon a piece of wood or the like.

I claim:

1. A rotary disk cutter comprising an annular head having an axial shank for securement in a drill press, said head having spaced arcuate teeth formed in the peripheral edge of the head, the forward cutting edge of one tooth being diametrically opposite the forward cutting edge of an opposed tooth, the under face of the head being of concave formation extending to the base of said teeth to define a cutting edge between said teeth.

2. A rotary disk cutter comprising an annular head having an axial shank for securement in a drill press, said head having spaced arcuate teeth formed in the peripheral edge of the head, the under face of the head being of concave formation extending to the base of said teeth to define a cutting edge between said teeth, the cutting edges between said teeth being at a right angle to the cutting edge of each tooth.

References Cited in the file of this patent

UNITED STATES PATENTS

| Number | Name | Date |
|---|---|---|
| Re. 444 | Woodbury | Mar. 31, 1857 |
| 6,249 | Spring et al. | Apr. 3, 1849 |
| 7,799 | Selden | July 17, 1877 |
| 269,315 | Orvm | Dec. 19, 1882 |
| 397,568 | Rudolph | Feb. 12, 1889 |

FOREIGN PATENTS

| Number | Country | Date |
|---|---|---|
| 48,690 | Germany | Sept. 21, 1889 |
| 712,168 | France | July 13, 1931 |
| 143,091 | Switzerland | Feb. 2, 1931 |